US008771871B2

(12) United States Patent
Furukawa et al.

(10) Patent No.: US 8,771,871 B2
(45) Date of Patent: Jul. 8, 2014

(54) LEAD STORAGE BATTERY AND MANUFACTURING METHOD OF THE SAME

(75) Inventors: Jun Furukawa, Iwaki (JP); Toshimichi Takada, Iwaki (JP); Daisuke Monma, Iwaki (JP); Hidetoshi Abe, Nikko (JP)

(73) Assignee: The Furukawa Battery Co., Ltd., Yokohama-shi, Kanagawa (JP)

( * ) Notice: Subject to any disclaimer, the term of this patent is extended or adjusted under 35 U.S.C. 154(b) by 548 days.

(21) Appl. No.: 11/720,602

(22) PCT Filed: Sep. 27, 2005

(86) PCT No.: PCT/JP2005/017697
§ 371 (c)(1),
(2), (4) Date: May 31, 2007

(87) PCT Pub. No.: WO2007/036979
PCT Pub. Date: Apr. 5, 2007

(65) Prior Publication Data
US 2008/0107960 A1     May 8, 2008

(51) Int. Cl.
*H01M 4/56* (2006.01)
*H01M 6/04* (2006.01)

(52) U.S. Cl.
USPC ............ 429/204; 429/188; 429/225; 429/228

(58) Field of Classification Search
None
See application file for complete search history.

(56) References Cited

U.S. PATENT DOCUMENTS

| | | | |
|---|---|---|---|
| 724,387 A | | 3/1903 | Gardner |
| 2,649,766 A | * | 8/1953 | Johnson ........................ 429/347 |
| 3,798,070 A | * | 3/1974 | Ruben ............................ 429/130 |
| 3,926,670 A | * | 12/1975 | Taylor et al. ................... 429/228 |
| 4,279,977 A | * | 7/1981 | Matter .......................... 429/245 |
| 4,346,022 A | | 8/1982 | Wolcott et al. ................. 252/509 |
| 4,725,516 A | * | 2/1988 | Okada et al. ................... 429/225 |
| 4,902,591 A | * | 2/1990 | Clerici et al. .................. 429/204 |
| 4,906,540 A | | 3/1990 | Hoshihara et al. |
| 5,339,873 A | | 8/1994 | Feldstein |
| 5,348,817 A | | 9/1994 | Rao et al. |
| 5,945,236 A | * | 8/1999 | Willis ........................... 429/205 |
| 5,952,123 A | * | 9/1999 | Hatanaka et al. ............. 429/217 |
| 6,218,052 B1 | | 4/2001 | Wang |
| 6,833,216 B2 | | 12/2004 | Snyder et al. |
| 2004/0142243 A1 | | 7/2004 | Furukawa et al. |
| 2009/0172932 A1 | | 7/2009 | Ozaki |

FOREIGN PATENT DOCUMENTS

| | | |
|---|---|---|
| CN | 1049427 A | 2/1991 |
| DE | 2434193 A1 | 2/1975 |
| DE | 3816767 A1 | 2/1989 |
| EP | 1496556 A1 | 1/2005 |
| JP | 49-71429 | 7/1974 |
| JP | 53-75444 | 7/1978 |
| JP | 60-211777 A | 10/1985 |
| JP | 63-148556 A | 6/1988 |
| JP | 64-38970 A | 2/1989 |
| JP | 2-10665 A | 1/1990 |
| JP | 5-109409 A | 4/1993 |
| JP | 8-64226 A | 3/1996 |
| JP | 9-289020 A | 11/1997 |
| JP | 10-188963 A | 7/1998 |
| JP | 2000-200598 A | 7/2000 |
| JP | 2000-315519 A | 11/2000 |
| JP | 2001-313064 A | 11/2001 |
| JP | 2001-338675 A | 12/2001 |
| JP | 2003-36882 A | 2/2003 |
| JP | 2003-51334 A | 2/2003 |
| JP | 2003-051334 A | 4/2003 |
| JP | 2003-109595 A | 4/2003 |
| JP | 2003-306733 A | 10/2003 |
| JP | 2003-346913 A | 12/2003 |
| JP | 2004-55309 A | 2/2004 |
| JP | 2006-4636 A | 1/2006 |
| WO | WO 94/07629 A1 | 4/1994 |
| WO | WO 01/04976 A1 | 1/2001 |

OTHER PUBLICATIONS

Chen et al., Journal of Power Sources 95, p. 108-118, 2001.*
Wang et al., Journal of Power Sources 55, p. 47-52, 1995.*
Furukawa et al, JP 2003-051334, English Abstract from PAJ.*
Furukawa et al, JP 2003-051334, English Translation from PAJ.*
Morishita, JP 02-010665, English Abstract from PAJ.*
K. Nakamura, et al., "Failure modes of valve-regulated lead/acid batteries." Journal of Power Sources 59 (1996), Elsevier Sciences S.A. SSDI 0378-7753 (95) 02317-8, pp. 153-157.
T. Rogachev, et al., "Influence of cycling on the nature of the positive active mass of lead /acid batteries and effect of $CaSO_4$ on the behaviour of the positive plates." Journal of Power Sources 64 (1997), Elsevier Sciences S.A. SSDI 0378-7753 (97) 0378-7753(96) 02501-3, pp. 51-56.
Korean Office Action (Notification for Filing Opinion) dated Dec. 23, 2009, which issued in counterpart Korean application 10-2007-7013946 and an English-language translation thereof.

(Continued)

Primary Examiner — Melvin C Mayes
Assistant Examiner — Colin W Slifka
(74) Attorney, Agent, or Firm — Holtz Holtz Goodman & Chick PC

(57) ABSTRACT

There is disclosed a lead storage battery comprising a group of plates housed in a battery jar, and an electrolyte injected therein to impregnate the group of plates with the electrolyte, thus performing formation treatment, the lead storage battery being adapted to be used in a partial state of charge where the state of charge is confined within the range of more than 70% to less than 100%, wherein the group of plates are formed of a stack constituted by a large number of negative substrates comprising grid substrates filled with a negative active material, by a large number of positive substrates comprising grid substrates filled with a positive active material, and by a porous separator interposed between the negative electrodes and positive electrodes, and the electrolyte contains at least one kind of ion selected from the group consisting of aluminum ions, selenium ions and titanium ions.

11 Claims, No Drawings

(56) References Cited

OTHER PUBLICATIONS

Supplementary European Search Report dated Oct. 2, 2009 for European Application No. 05787948.8-1227.

R. Wagner. "Failure modes of valve-regulated lead/acid batteries in different applications." Journal of Power Sources, Elsevier SA, CH, vol. 53, No. 1, Jan. 1, 1995, pp. 153-162.

* cited by examiner

LEAD STORAGE BATTERY AND MANUFACTURING METHOD OF THE SAME

This application is a U.S. National Phase Application under 35 USC 371 of International Application PCT/JP2005/017697 filed Sep. 27, 2005.

TECHNICAL FIELD

This invention relates to a lead storage battery and to a method of manufacturing the lead storage battery. In particular, this invention relates to a lead storage battery for automobile which can be used in a partial state of charge (hereinafter referred to as PSOC) as in the cases of charge-control or idling-stop, and to method of manufacturing such a lead storage battery.

BACKGROUND ART

Conventionally, a lead storage battery for automobile is employed as a power source in actuating a starter motor for starting the engine, as a power source for lighting or ignition, or as a power source for various kinds of motors which may be mounted in an amount of 100 or more in the case of a high-class car.

However, since the lead storage battery for automobile is employed in such a manner that electric power is always supplied to the lead storage battery through the driving of a generator by the engine of the automobile except the moment when the starter is actuated for starting the automobile, the lead storage battery for the automobile is not discharged so deeply up to date. Rather, since the lead storage battery is always placed into a state of over-charge in most cases due to the charging by the automobile generator, the lead storage battery is conventionally required to be highly resistive to the over-charging. Additionally, it is required that the lead storage battery is constructed such that the decrease of electrolyte due to the generation of gas during over-charging can be inhibited, thus not requiring the replenishment of water and rendering the battery excellent in being maintenance free. In view of this, the alloy now employed for the positive electrode is made of Pb—Ca type alloy instead of Pb—Sb type alloy.

However, since there are strong demands to improve the fuel consumption and to minimize the noxious exhaust gas in automobile in recent years, the conditions for operating the lead storage battery for automobile have been greatly changed.

One example of such operating conditions is the charge-control, i.e., suppression of charging to a lead storage battery. Conventionally, the charging of lead storage battery for automobile has been performed through the operation of generator by the engine as in the case of feeding electric power to other electrical equipments. Therefore, the lead storage battery is always brought into a state of over-charging, thereby naturally deteriorating the fuel consumption. In view of this, the charge-control of lead storage battery is now actually executed, thus improving the fuel consumption and minimizing the obnoxious exhaust gas.

Further, in view of improving the fuel consumption through prevention of over-charging of lead storage battery, it is also proposed to detect the state where the charging of lead storage battery is required and to perform the charging of lead storage battery only when such a state is recognized, thereby avoiding redundant charging and improving the fuel consumption.

However, if the charging of lead storage battery is to be performed only when the charging is found required as a result of the detection of the aforementioned partial state of charge (PSOC) or the fuel consumption efficiency, the opportunity of performing the charging of lead storage battery would be restricted, so that the lead storage battery would be always used in a PSOC. However, if the lead storage battery is used in such a partial state of charge, the lead storage battery, especially the lead storage battery which is low in charging efficiency, would be brought into a state of chronic insufficient-charging on the contrary. In that case, it may be required to frequently perform so-called refresh charge wherein the state of charge (hereinafter referred to as SOC) of the lead storage battery is increased up to 100% in order to overcome the aforementioned state of chronic insufficient-charging. As a result, the fuel consumption would be deteriorated on the contrary.

Another example of such operating conditions in the employment of lead storage battery is an operation accompanying so-called idling-stop where the engine is stopped during the stoppage time due to a stop signal, etc. During this idling-stop, the feed of power from the generator is also suspended due to the stop of engine. As a result, the feed of power during this time will be covered by the discharging from the lead storage battery, thus increasing the opportunity of discharging of lead storage battery as compared with the conventional operation of the battery, thus also resulting in the use of the battery in a PSOC. In this case also, so-called refresh charge of lead storage battery is required to be frequently performed, resulting in the deterioration of fuel consumption.

The state of charge of the lead storage battery in this PSOC is generally confined within the range of more than 70% to less than 100%. Because, in the case of automobile where the start of engine is guaranteed by the use of only one lead storage battery in principle, there are possibilities of raising a problem in the start-up of engine if the SOC is not more than 70%. Therefore, the lower limit of the SOC is generally set to more than 70%.

On the other hand, 100% in the state of charging cannot be achieved unless the lead storage battery is always charged into a state of over-charging. However, this over-charging would become a cause for deteriorating the fuel consumption as described above. Therefore, the upper limit of the SOC is generally set to less than 100%.

Further, in the case of a hybrid system (HVS) where the brake-regenerating electric power is temporarily stored in a lead storage battery and then quickly discharged on the occasion of assisting the acceleration, even if the lead storage battery is to be operated in a partial state of charge as described above, the lead storage battery is usually operated by setting the upper limit of state of charge to not more than 70% in order to secure a high charging efficiency. As for the prior art concerning the lead storage battery having a hybrid function where regenerated electric power is utilized in the charge and discharge of lead storage battery, it is described in JP Laid-open Patent Publication (Kokai) No. 2003-36882 and JP Laid-open Patent Publication (Kokai) No. 2003-51334. According to these publications, the SOC is always confined to the range of 50-70% in order to perform quick charging at high-efficiencies. In this case however, a battery for starting engine is separately mounted so as to obviate any problem in a low temperature start-up of engine.

When the charge-control or idling-stop is executed under this condition using the conventional lead storage battery which is designed attaching importance to the resistance to the corrosion of positive grid or gross on the occasion of over-charging, it is impossible to obtain a sufficient charging efficiency in spite of the fact that the opportunity of charging is not so many. Because of this, the conventional lead storage battery is liable to be brought into a state of chronic insufficient-charging. If this problem is to be overcome, it is required to frequently perform the refresh charge, thus making it impossible to sufficiently contribute to the improvement of fuel consumption which the charge-control is inherently aimed at.

Further, since the conventional lead storage battery is brought into a state of chronic insufficient-charging when the lead storage battery is kept in a partial state of charge, not only the surface of negative electrode but also the surface of positive electrode is suffered from a phenomenon of sulfation where lead sulfate is accumulated, thus raising the problem that the life of lead storage battery is considerably shortened.

In connection with this problem, there are proposed a flooded lead storage battery and a sealed lead battery, wherein about 0.1 mol/L of sulfate of alkaline metal (such as sodium) or sodium alum which is a double salt consisting of sodium and aluminum is added to the electrolyte for the purpose of preventing the short-circuit to be caused by the lowering of specific gravity of electrolyte due to a continuous discharging (JP Laid-open Patent Publication (Kokai) No. 8-64226 (1996)).

However, it has been made clear as a result of extensive studies made by the present inventor that even though the aforementioned object can be achieved in the case of the conventional lead storage battery to be employed in full charge state, there is a problem in the case of the lead storage battery which is designed to be employed in a PSOC that the charging efficiency thereof is caused to considerably deteriorate due to the influence of sodium ion and that this bad influence is far greater than the aforementioned object.

As for the means to overcome the sulfation of negative electrode of lead storage battery, there is known an idea of adding carbon to the negative electrode at a larger quantity than ordinary employed (Journal. Power Sources vol. 59 (1996), 153-157). Although nothing is disclosed about the adding quantity of carbon in this prior publication, it is described therein that the carbon added in this manner is enabled to enter into interstices of lead sulfate to thereby create a conductive pass. Therefore, various kinds of tests were performed by the present inventor, wherein a wide range in quantity of carbon was tried in these tests. As a result, it was confirmed that the effects of elongating the life of the lead storage battery are limited under the conditions of charge-control or idling-stop, and that it was difficult, in industrial viewpoint, to put the idea into practical use under the conditions of charge-control or idling-stop.

There is also known a prior art wherein an organic acid such as polyacrylic acid or ester is added to an electrolyte (JP Laid-open Patent Publication (Kokai) No. 2001-313064). However, this prior art is defective in that since the grid is caused to corrode, it is not suited for practical use. Furthermore, there is also known a prior art wherein titanium, aluminum or potassium is added to a gel-like electrolyte to improve the low temperature start-up performance (JP Laid-open Patent Publication (Kokai) No. 60-211777 (1985)). However, the technique disclosed in this prior art is liable to deteriorate the electric conductivity of electrolyte, failing to contribute to the alleged improvement. Further, there is also known a prior art wherein selenium and an organic acid are added to an electrolyte so as to suppress the generation of hydrogen from the negative electrode and to promote the reduction of oxygen (JP Laid-open Patent Publication (Kokai) No. 64-38970 (1989)). According to this prior art however, the quantity of selenium to be added is as large as 100-1000 ppm, causing the selenium to precipitate in the electrolyte, thus badly affecting the lead storage battery on the contrary.

Another reason for shortening the life of lead storage battery can be ascribed to the fact that due to the demand for the development of maintenance-free lead storage battery, the material for the positive substrate of lead storage battery is changed to a Pb—Ca type material from a Pb—Sb type material. In the case of the Pb—Sb alloy that has been conventionally employed, pentavalent antimony ion that has been generated from the oxidization of the substrate is enabled to act on an active material so as to enhance the adhesion of the grid-active material interface, thus gelating part of the active material to strengthen the bonding among the active material. As a result, even if deep charging/discharging is repeated, it is possible to inhibit the peeling between the grid and the active material or the softening of the active material.

In the case of the Pb—Ca type alloy however, the aforementioned effects that can be achieved by antimony are rather weakened. Therefore, when deep charging/discharging is repeated, the active material is caused to peel away from the grid at an early stage and the bonding among the active material is deteriorated and hence the active material is softened, thus shortening the life of battery.

There has been proposed by the present inventor an alloy for the substrate of lead storage battery (JP Laid-open Patent Publication (Kokai) No. 2003-306733), which makes it possible to enhance the corrosion resistance and mechanical strength of electrode plate, the alloy comprising 0.02-0.05 wt % of Ca, 0.4-2.5 wt % of Sn, 0.005-0.04 wt % of Al, and 0.002-0.014 wt % of Ba. This alloy may further include at least one kind of element selected from the group consisting of 0.005-0.07 wt % of Ag, 0.01-0.10 wt % of Bi, and 0.001-0.05 wt % of Ta.

However, it has been found that even in the case of this high-corrosion resistance alloy for substrate, features such as the adhesion between positive substrate and the active substrate and the bonding property among the active material are rather inferior as compared with the conventional Pb—Ca type alloy, thus raising problems in these respects.

It is considered that calcium ion is inherently provided with a function of enhancing the adhesion between the grid and the active material, or the adhesion among the active material (Journal. Power Sources vol. 64 (1997), 51-56). Certainly, it has been recognized that the calcium ion that has been eluted from the alloy substrate containing 0.06-0.1 wt % of calcium has such a function.

On the other hand, it is considered that the corrosion resistance of the alloy tends to increase as the content of Ca in the alloy is decreased. In the case of the substrate alloy disclosed in the aforementioned JP Laid-open Patent Publication (Kokai) No. 2003-306733 for instance, the corrosion resistance of the alloy was considerably improved as the content of Ca was less than 0.05 wt %. On the contrary however, it has been found that, in this alloy, the feeding of calcium ion eluted from the alloy to the active material is caused to decrease, thus making it difficult to enhance the adhesion among the active material.

There is also known a technique which is aimed at overcoming the aforementioned problem, wherein a layer comprising antimony is deposited on the surface of positive substrate, or an antimony compound is added to the positive substrate, thereby obtaining the same effects as obtainable by the employment of Pb—Sb type alloy (JP Laid-open Patent Publications (Kokai) No. 49-71429 (1974); No. 53-75444; and No. 63-148556).

Additionally, there are known various techniques aimed at maintaining the same degree of bonding strength of active material as obtainable by the employment of antimony, such prior art including a technique wherein the surface layer of electrode substrate is constituted by a lead alloy layer containing at least one element selected from alkaline metal and alkaline earth metal (WO-01/04976-A1); a technique wherein tin dioxide and calcium sulfate are incorporated into the active material layer (JP Laid-open Patent Publications (Kokai) No. 9-289020 (1997)); and a technique wherein 0.5-5 wt % (as reduced to metal tin and based on positive active material) of metal tin or a tin compound is incorporated into the positive active material and, at the same time, the density of positive active material is confined to 3.8-5.0 g/cc (JP Laid-open Patent Publications (Kokai) No. 10-188963 (1998)). All of these prior arts are certainly effective under the conditions where the conventional lead storage battery is to be employed.

However, under the conditions of use where a lead storage battery is subjected to charge-control or idling-stop, since the charging/discharging is repeated in a PSOC for a long period of time, the aforementioned countermeasures are insufficient in coping with problems of the shedding or softening of active material.

Moreover, in addition to the requirements of the lead storage battery to improve the fuel consumption and reduce the exhaust gas, it is further required to enhance the start-up performance (discharge property) and positive active material, thus making it possible to decrease the weight of battery. In view of enhancing the positive active material of the lead storage battery, it has been tried to improve the dispersion of electrolyte. For this purpose, a method of decreasing the density of positive active material is generally employed.

However, when a Pb—Ca type alloy is employed as a positive grid, the active material is liable to be peeled off from the grid due to charging/discharging and additionally the active material is caused to soften and shed, thus shortening the life of battery considerably. There has been proposed a method of incorporating graphite into the positive active material in order to overcome the aforementioned problems.

In this case, graphite is caused to expand as sulfate ion intercalates into interstices due to the injection of an electrolyte, thus creating voids in the active material, these voids in the active material being further increased due to the dissipation through oxidation during charging. However, the expansion of graphite invites at the same time the destruction of active material, thus also resulting in the shortened life of battery. Because of this, the aforementioned technique is applicable only to a seal type lead battery where a group of plates are strongly compressed. However, even in this case, the battery jar may be caused to deform or destroyed due to the expanded positive electrode.

With a view to overcome the aforementioned problems, there has been proposed a technique wherein lead powder, red lead, fibrous resin, expanded graphite and dilute sulfuric acid are kneaded together under a reduced pressure to form a paste, which is employed for fabricating the active material (JP Laid-open Patent Publication (Kokai) No. 2004-55309). Although all of these prior arts are certainly effective under the conditions where the lead storage battery is conventionally employed, the aforementioned prior arts are not sufficiently effective under the conditions of use where a lead storage battery is subjected to charge-control or idling-stop, since the charging/discharging is repeated in a PSOC for a long period of time.

DISCLOSURE OF INVENTION

An object of the present invention is to provide a lead storage battery for automobile which is adapted to be employed under the conditions wherein the charging/discharging thereof is repeated in a partial state of charge (PSOC) as in the cases of charge-control or idling-stop, the lead storage battery being capable of greatly improving charging efficiency under the conditions where the state of charging is confined within the range of more than 70% to less than 100%.

In order to achieve the aforementioned object, there is provided a lead storage battery according to one embodiment of the present invention, which is characterized in that at least one kind of ion selected from the group consisting of aluminum ions, selenium ions and titanium ions is incorporated into an electrolyte. There is also provided a lead storage battery according to another embodiment of the present invention, which is characterized in that the content of sodium ions in the electrolyte is confined to the range of 0.002-0.05 mol/L.

According to another aspect of the present invention, there is also provided a method of manufacturing a lead storage battery comprising a group of plates housed in a battery jar, and an electrolyte injected therein to impregnate the group of plates with the electrolyte, thus performing formation treatment, the lead storage battery being adapted to be used in a partial state of charge where the state of charge is confined within the range of more than 70% to less than 100%, wherein the group of plates is formed of a stack constituted by a large number of negative substrates comprising grid substrates filled with a negative active material, by a large number of positive substrates comprising grid substrates filled with a positive active material, and by a porous separator interposed between the negative substrates and positive substrates; the method being characterized in that at least one kind of compound or metal which is soluble in an aqueous solution of sulfuric acid and contains aluminum ions, selenium ions or titanium ions is incorporated into the positive active material or positioned in contact with the electrolyte at a portion of the battery jar, thereby enabling the ions to elute into the electrolyte to form an electrolytic solution incorporated with at least one kind of ion selected from the group consisting of aluminum ions, selenium ions, titanium ions and lithium ions.

BEST MODE FOR CARRYING OUT THE INVENTION

The present invention relates to a lead storage battery which is adapted to be used in a partial state of charge (PSOC) where the state of charge (SOC) is confined within the range of more than 70% to less than 100%, wherein the electrolyte thereof contains at least one kind of ion selected from the group consisting of aluminum ions, selenium ions and titanium ions. As for the content of these ions, aluminum ions should be confined within the range of 0.01-0.3 mol/L, selenium ions should be confined within the range of 0.0002-0.0012 mol/L, and titanium ions should be confined within the range of 0.001-0.1 mol/L.

If the content of aluminum ions is less than 0.01 mol/L, the effect thereof to enhance the charging efficiency would become insufficient. On the other hand, if the content of aluminum ions exceeds over 0.3 mol/L, the electric conductivity of electrolyte would be decreased, thereby deteriorating the charging performance and quick discharging property of battery.

If the content of selenium ions is less than 0.0002 mol/L, the effect thereof would become insufficient. On the other hand, if the content of selenium ions exceeds over 0.0012 mol/L, metal selenium tends to be easily precipitated in the electrolyte, thereby raising an adverse influence that the precipitated selenium would become a cause for the generation of short-circuit, and furthermore, even if the content of selenium ions is higher than this upper limit, it would be impossible to expect any further improvement of effect thereof. If the content of titanium ions is less than 0.001 mol/L, the effect thereof would become insufficient. On the other hand, if the content of titanium ions exceeds over 0.1 mol/L, the electric conductivity of the electrolyte would deteriorate, thus badly affecting the charging performance and quick discharging properties of the battery.

Since it has been found that the existence of sodium ions in the electrolyte of lead storage battery hinders the effects of aluminum ions to improve the charging efficiency, the content of sodium ions is confined to not more than 0.05 mol/L. Although it has been conventionally known to add sodium ions and magnesium ions in conformity with an increase in concentration of sulfate ions of electrolyte, the existence of sodium ions in the electrolyte deteriorates charging efficiency of lead storage battery of the present invention. Although the reason is not clear, sodium ion in the electrolyte acts to deteriorate the charging efficiency in a PSOC, thereby reducing the effect of improving the charging efficiency to be derived from the employment of aluminum ions, selenium ions or titanium ions in the present invention. Additionally, it is considered that sodium ions has other bad influences which become more prominent especially at a temperature of not higher than the ordinary temperature under which the charging efficiency would be deteriorated.

The lower limit of the content of sodium ion is 0.002 mol/L. Even if this lower limit is further lowered, any further effect cannot be expected. Further, since lignin to be employed as an additive for negative electrode is sodium salt in general, when the content of sodium ions is decreased to lower than the aforementioned lower limit, it would lead to the reduction in quantity of lignin to be added, thus deteriorating the life of lead storage battery on the contrary.

JP Laid-open Patent Publications (Kokai) No. 2003-36882 describes a lead storage battery which uses regenerated power in a partial state of charge (PSOC) or 70-100% in charging state, wherein a predetermined quantity of carbon, barium sulfate or lignin is added to the negative electrode, and at least one kind of material selected from K, Ca and Al is added to the electrolyte. However, this document discloses nothing about bad influence of sodium. Further, JP Laid-open Patent Publications (Kokai) No. 2003-51334 discloses an idea of adding at least one kind of material selected from K, Ca and Al to the electrolyte at a predetermined ratio in order to overcome the deterioration of negative electrode by the sulfation thereof. This document discloses nothing about bad influence of sodium in a lead storage battery which uses regenerated power in a PSOC or 70-100% in charging state.

Whereas, the present invention is directed to a lead storage battery which is adapted to be used in a PSOC where the state of charge is confined within the range of more than 70% to less than 100% and which is designed to be repeatedly used for a long time at a further deep charging/discharging. Therefore, in order to enhance the charging efficiency of battery, the content of sodium ion in the electrolyte is required to be limited to 0.05 mol/L or less. Additionally, it has been found out by the present inventor that when at least one kind of ion selected from aluminum ions, selenium ions and titanium ions is added to the electrolyte at a ratio of 0.01-0.3 mol/L for aluminum ions, 0.0002-0.0012 mol/L for selenium ion, and 0.001-0.1 mol/L for titanium ions, it is possible to considerably improve the charging efficiency of battery.

The lead storage battery according to the present invention if featured in that the plate thereof is formed of a lead-calcium-based alloy comprising 0.02-0.05 wt % of Ca, 0.4-2.5 wt % of Sn, 0.005-0.04 wt % of Al, 0.002-0.014 wt % of Ba, and the balance of lead and unavoidable impurities.

Ca is useful in enhancing the mechanical strength of the plate. If the content of Ca is less than 0.02 wt %, the mechanical strength of the plate would become insufficient, and if the content of Ca exceeds over 0.05 wt %, the corrosion resistance of the plate would be deteriorated. When the content of Ca is confined to that mentioned above and Ba is confined within the range of 0.002-0.014 wt %, it is possible to improve the corrosion resistance of the plate while enhancing the mechanical strength thereof. If the content of Ba is less than 0.002 wt %, the mechanical strength of the plate would become insufficient, and if the content of Ba exceeds over 0.014 wt %, the corrosion resistance of the plate would be deteriorated. The addition of tin is useful in enhancing the flow of molten alloy and mechanical strength, and, at the same time, the grids of lead storage battery as well as the interface of substrate/active material can be doped with the tin, thereby enhancing the electric conductivity thereof. If the content of tin is less than 0.4 wt %, the aforementioned effects would become insufficient and also the corrosion resistance of the plate would become insufficient. Further, if the content of tin exceeds over 2.5 wt %, the crystal grain of the plate would become more coarse, thus causing the grain boundary corrosion to proceed faster than the apparent corrosion. The addition of Al is useful in suppressing the loss of Ca and Ba that may be caused due to the oxidation of melt, and the content of Al is limited to not more than 0.04 wt %. If the content of aluminum exceeds over 0.04 wt %, aluminum tends to be precipitated as dross.

When at least one kind of metal and/or a compound of the metal selected from bismuth, antimony and calcium is included in the surface of positive substrate or in a positive active material of the present invention, it is effective in improving the adhesion between the positive active material and the interface of grid or among the active material. The surface of positive substrate and the positive active material may further contain tin and/or arsenic as a metal or a compound in further improving the effect of adhesion.

Although the reason for the effects that can be obtained from the employment of tin or arsenic is not yet clearly determined, it seems to be attributed to the phenomenon that the α-$PbO_2$ layer, i.e. an interface between the substrate and the active material is doped with tin to thereby improve the electric conductivity of the layer, thus making it possible to obtain substantially the same effects as that where the adhesion of the interface is enhanced. Especially, since there is a report that when $PbO_2$ is doped with bismuth, the oxidation catalytic capability thereof can be enhanced, it is assumed that the tin contributes to the stabilization of $SnO_2$ excellent in electric conductivity. With respect to the adhesion among the active material also, it is conceivable that although the surface thereof which reacts with an aqueous solution of sulfuric acid constituting the electrolyte is formed of β-$PbO_2$, the interior thereof is formed of α-$PbO_2$, so that almost the same effect will be obtained.

Although arsenic is inferior in the effect of improving the conductivity as compared with tin, the effect thereof to enhance the electric conductivity can be admitted and at the same time, arsenic is useful in suppressing the dissolution of antimony and in preventing the deterioration of hydrogen overvoltage of negative electrode. Therefore, arsenic is useful in enhancing the maintenance-free characteristics of battery.

As described above, the effect of promoting the life of lead storage battery through the employment of bismuth, antimony, calcium, tin and arsenic has been conventionally known. However, this conventional technique is limited to a situation where the active material is in a state of $PbO_2$, i.e., in a charged state, which is quite different from the circumstances where the lead storage battery is in a state of idling-stop or charge-control where lead sulfate is co-existed and exposed always under the condition of insufficient charging.

Specifically, it is important that lead sulfate generated under the condition of insufficient charging as in the case of idling-stop or charge-control can be reversibly oxidized into $PbO_2$ by the charging, thereby enabling the skeleton of active material to be properly retained. If lead sulfate is always permitted to remain irreversibly even if charging is performed, the skeleton of active material would be gradually destroyed, thus promoting the softening of active material.

Whereas, aluminum ions, selenium ions or titanium ions included in the electrolyte according to the present invention is assumed to be capable of preventing the aforementioned undesirable phenomenon in a lead storage battery which is to be employed under the conditions of idling-stop or charge-control.

Namely, since the electrolyte of lead storage battery placed in a state where the SOC is 70% or more is relatively high in specific gravity, the solubility of lead sulfate is caused to decrease. However, when aluminum ions, etc., is added to the electrolyte, these additives are adsorbed by $Pb^{2+}$ ions, thus supplementing $Pb^{2+}$ ion which may become insufficient at the time of charging. As a result, polarization is assumed to be inhibited, resulting in the enhancement of charging efficiency.

In other words, due to the dissolution/precipitation reaction, reactions of: $PbSO_4 \rightarrow PbO_2$ at the positive electrode; and $PbSO_4 \rightarrow Pb$ at the negative electrode take place during the charging. On this occasion, if the concentration of sulfuric acid in the electrolyte is high and the specific gravity thereof is high (where SOC is not less than 70%), the solubility of $PbSO_4$ would become low and the dissolution of $Pb^{2+}$ ions would be decreased, thus reducing the concentration thereof and deteriorating the charging efficiency. However, if Al ions, etc., is existed in this case, the $Pb^{2+}$ ions existing around the Al ions is assumed to be adsorbed and captured by the Al ion, thus increasing the concentration of the $Pb^{2+}$ ion. As a result, the oxidation and reduction of the $Pb^{2+}$ ion can be facilitated to enhance the charging efficiency.

As described above, due to the effect of bismuth, antimony and calcium with the accompaniment of tin or arsenic, it is possible to inhibit the peel-off of the active material from the grid or the softening of active material. Further, due to the action of aluminum ion, selenium ion or titanium ion, it is possible to concurrently enhance the reversibility of lead sulfate produced in the positive and negative electrodes, thereby making it possible to achieve the elongation of the life of lead storage battery to be employed under the conditions of idling-stop or overcharge control. The elongation of this lead storage battery can be achieved not only under the conditions of idling-stop, etc., but also under the conventional conditions for use.

As for the method of incorporating bismuth, antimony and calcium with the accompaniment of tin or arsenic into the lead storage battery, it is possible to employ a method of mixing these substances with the active material or a method of coating these substances, as a layer, on the surface of substrate. Preferable mixing ratios (measured as metal) of these substances are 0.005-0.5 wt % for bismuth; 0.005-0.2 wt % for antimony; 0.05-1.5 wt % for calcium; 0.005-1.0 wt % for tin; and 0.005-0.2 wt % for arsenic. When the mixing ratios of these substances are less than aforementioned lower limits, it would be impossible to secure the effects thereof. Further, when the mixing ratios of these substances are higher than aforementioned upper limits, the effects expected would be deteriorated in the case of bismuth, the maintenance-free property would be deteriorated in the case of antimony, and the effects expected would be deteriorated in the case of calcium. Further, in the case of tin, the addition thereof exceeding over the upper limit would not lead to any increased effect and at the same time, would become a cause for the short-circuit due to the dissolution thereof in the electrolyte. In the case of arsenic, the addition thereof exceeding over the upper limit would result in a problem of deteriorating the effects expected.

Further, when expanded graphite is added to the positive electrode in the lead storage battery of the present invention, the expanded graphite is oxidized and vanished during charging, thus forming voids in the active material, thus enabling the interior of the voids to be utilized as an active surface to the electrolyte and hence enabling the active material to exhibit a high utilization factor. As a result, the softening of active material would be accelerated. On the other hand however, when bismuth is added to the active material, thus enabling bismuth to be doped in $\beta$-$PbO_2$ which is a positive active material, the water in the crystal of $\beta$-$PbO_2$ is stabilized and locally denatured into lead hydroxide, which is known to inhibit the aforementioned softening as it plays a role of glue among the particles of active material.

Namely, when expanded graphite and bismuth are concurrently added to the positive active material, the interior of voids that have been formed due to the addition of expanded graphite would be alkalinized, thus creating an environment of electrolyte where lead hydroxide can be easily generated. Namely, the addition of bismuth in this case would result in a further enhanced effect of suppressing the softening of active material as compared with that obtainable from the addition of bismuth according to the prior art. In this case, since aluminum ion, selenium ion or titanium ion is added to the electrolyte, these atoms are enabled to enter into the crystal lattice of lead sulfate to distort the crystal lattice or enabled to adsorb onto the surface of crystal to obstruct the crystal growth, thereby inhibiting the growth of crystal of lead sulfate. As a result, the reversibility of lead sulfate to lead can be enhanced, thus making it possible to further suppress the sulfation.

The mixing ratio of expanded graphite should preferably be confined to the range of 0.1-2.0 wt % based on the positive active material. If the mixing ratio of expansive graphite is less than 0.1 wt %, it would be impossible to obtain the effects expected therefrom. Further, even if the mixing ratio of expanded graphite exceeds over 2.0 wt %, it would be impossible to expect any increased effect and at the same time, the preparation of paste would become difficult. The mixing ratio of bismuth should preferably be confined to the range of 0.01-0.5 wt % (as pure metal) based on the positive active material. If the mixing ratio of bismuth is less than 0.01 wt %, it would be impossible to obtain the effects expected therefrom. Further, if the mixing ratio of bismuth exceeds over 0.5 wt %, it would more likely result in the deterioration of discharge characteristics.

Further, in the lead storage battery of the present invention, it is possible to increase the capacity thereof through the addition of a small quantity of lithium ion into the electrolyte. When lithium ion is added to the electrolyte, lithium ion is enabled to enter into the crystal lattice of lead oxide to distort the crystallinity thereof, thereby enhancing the utilization factor of positive electrode. The content of lithium ion should preferably be confined to not more than 0.14 mol/L. If lithium ion is added to the electrolyte at a ratio higher than this upper limit, the life of battery would be deteriorated on the contrary. If it is desired to secure an enhancement in the utilization factor of positive electrode, the addition of lithium ion at a ratio of not less than 0.005 mol/L would be sufficient.

In a lead storage battery where lithium ion is included in the electrolyte, the effects to be derived from the addition of aluminum ion, selenium ion or titanium ion to the electrolyte are considered as follows. Namely, the increase in crystal size and the densification of lead sulfate particles, which may be created in the positive or negative electrodes, can be suppressed due to aluminum ion, selenium ion or titanium ion, thus making it possible to prolong the effects of lithium as long as possible. As a result, it is possible to decrease the weight of lead storage battery and, at the same time, to prolong the life of the battery due to the enhancement of the utilization factor of positive electrode.

It has been conventionally practiced to add carbon to the negative electrode as means to overcome the sulfation of the negative electrode. In the present invention however, at least one kind of ion selected from aluminum ion, selenium ion and titanium ion is added to the electrolyte in addition to carbon. As a result, it is possible to greatly improve the charging efficiency of the negative electrode in the lead storage battery which is designed to be used in a partial state of charge. Although the reason for this is not yet made clear, it is assumed that aluminum ion, selenium ion and titanium ion are capable of increasing the concentration of sulfate ion at the surface of negative electrode and also capable of suppressing the controlled diffusion of electrolyte during charging. The mixing ratio of carbon to the negative electrode should preferably be confined to the range of 0.05-5 wt % based on the negative electrode active material. If the mixing ratio of carbon is less than 0.05 wt %, it would be impossible to obtain the effects expected therefrom. On the other hand, if the mixing ratio of carbon exceeds over 5 wt %, hydrogen gas may be generated to a great extent during charging, so that the electrolyte would be caused to decrease soon, inviting in an increase of internal resistance.

In the present invention, aluminum ion, selenium ion or titanium ion as well as lithium ion can be incorporated into an electrolyte by a process wherein compounds or metals comprising these elements and soluble in an aqueous solution of sulfuric acid for example are added at first into a positive active material and subsequently these ions are enabled to dissolve into the electrolyte from the positive electrode. If these compounds or metals are added to a negative electrode, ions may be trapped or reduced into metals especially in the case of selenium. Therefore, it is advisable to incorporate these compounds or metals into a positive active material. Alternatively, these compounds or metals may be positioned at a portion of battery jar where these compounds or metals are enabled to be contacted with the electrolyte, thus enabling these compounds or metals to dissolve in the electrolyte.

EXAMPLES

Examples 1-13; Comparative Examples 1-7

By making use of an alloy composition for a positive substrate, which is consisted of 0.04 wt % of calcium, 1.0 wt % of tin, 0.015 wt % of aluminum, 0.008 wt % of barium and the balance of lead and unavoidable impurities, a cast type substrate was manufactured by means of book molding. The casting was performed at a rate of 15 sheets per minute. The substrate thus cast was subjected to heat treatment for 3 hours at a temperature of 120° C. to obtain an age-hardened substrate. Then, this age-hardened substrate was filled with a positive active material paste prepared according to the ordinary method conventionally known. The resultant substrate was combined with a negative plate of pre-formation (i.e. not yet subjected to formation) which was prepared according to the ordinary method conventionally known, and with a polyethylene separator. This resultant assembled body was placed in a battery jar, into which an electrolyte consisting of a dilute aqueous solution of sulfuric acid was injected to perform the formation of battery jar, thus manufacturing a 12V lead storage battery of D23 size where 5-hour rated capacity was 50 Ah. This lead storage battery was compared with the lead storage battery of Comparative Example 1.

Then, in the same manner as the aforementioned manufacturing process of lead storage battery, various kinds of electrolytes were prepared by making use of, as a sulfate, aluminum ion, selenium ion or titanium ion and by variously changing the quantity thereof. These electrolytes were respectively injected into a battery jar to perform the formation of battery jar, thus manufacturing 12V lead storage batteries of D23 size where 5-hour rated capacity was 50 Ah. Depending on the quantity of these metal ions, these batteries were classified into the lead storage batteries of examples of the present invention and the lead storage batteries of comparative examples 2-7. When the electrolytes of these lead storage batteries where the aforementioned formation was accomplished were analyzed, the content of sodium ion therein was found to fall in the range 0.01 to 0.02 mol/L. The charging efficiency of these lead storage batteries was assessed as follows.

First of all, these lead storage batteries were completely charged at a temperature of 25° C. using a 5-hour rated current. Then, these lead storage batteries were subjected to a cycle test which was repeated ten thousands times under the conditions of idling-stop. Namely, one cycle of this cycle test was consisted of a period of constant-current discharging for 59 seconds with a current of 50 A and for one second with a current of 300 A at 40° C., and a period of constant-current/constant-voltage charging for 60 seconds with a current of 100 A and an upper limit voltage of 14.0V. Thereafter, the discharging of these lead storage batteries was performed at a temperature of 25° C. using a 5-hour rated current, thereby assessing the charging efficiency from the ratio of residual capacity to the initial capacity. The results are shown in Table 1.

TABLE 1

Kinds of ions added and charging efficiency

| No. | Kinds and quantity of ions (mol/l) | | | Ratio of residual capacity (%) |
|---|---|---|---|---|
| | Al | Se | Ti | |
| Comp. Ex. 1 | — | — | — | 35 |
| Comp. Ex. 2 | 0.005 | — | — | 46 |
| Example 1 | 0.01 | — | — | 56 |
| Example 2 | 0.1 | — | — | 67 |
| Example 3 | 0.3 | — | — | 53 |
| Comp. Ex. 3 | 0.4 | — | — | 45 |
| Comp. Ex. 4 | — | 0.0001 | — | 43 |
| Example 4 | — | 0.0002 | — | 52 |
| Example 5 | — | 0.0005 | — | 61 |
| Example 6 | — | 0.0010 | — | 64 |
| Example 7 | — | 0.0012 | — | 64 |
| Comp. Ex. 5 | — | 0.0015 | — | Se precipitated as metal |
| Comp. Ex. 6 | — | — | 0.0005 | 41 |
| Example 8 | — | — | 0.001 | 52 |
| Example 9 | — | — | 0.01 | 63 |
| Example 10 | — | — | 0.1 | 55 |
| Comp. Ex. 7 | — | — | 0.2 | 48 |

TABLE 1-continued

Kinds of ions added and charging efficiency

| No. | Kinds and quantity of ions (mol/l) | | | Ratio of residual capacity (%) |
| --- | --- | --- | --- | --- |
| | Al | Se | Ti | |
| Example 11 | 0.1 | 0.001 | — | 68 |
| Example 12 | 0.1 | — | 0.01 | 68 |
| Example 13 | 0.1 | 0.001 | 0.01 | 69 |

As clearly seen from the results of Table 1, in the case of the examples of the present invention where the content of aluminum ion was confined to the range of 0.01-0.3 mol/L, the content of selenium ion was confined to the range of 0.0002-0.0012 mol/L, or the content of titanium ion was confined to the range of 0.001-0.1 mol/L, the ratio of residual capacity in any of these examples was as high as 50% or more. By contrast to this, in the case of the examples where aluminum ion, selenium ion or titanium ion was not included in the electrolyte or the content of these ions in the electrolyte was smaller or larger than the aforementioned ranges, the ratio of residual capacity of these examples was all less than 50% or more. Further, as seen from Examples of 11 to 13, even if two or more kinds of ions selected from aluminum ion, selenium ion and titanium ion were included in the electrolyte, it was possible to obtain a ratio of residual capacity of as high as 50% or more.

In these examples, metal ions were added, as a sulfate, to the electrolyte. However, the present invention is not limited to the aforementioned sulfates. Namely, these ions can be added as a metal or a compound such as sulfite, carbonate, hydrogen carbonate, phosphate, borate, hydroxide, metallic acid salt as long as the metal or the compound are soluble in an aqueous solution of sulfuric acid. Further, in these examples, these metal ions were applied to the battery by dissolving them in an electrolyte and then injecting the electrolyte into the lead storage battery. However, these compounds which are soluble in an aqueous solution of sulfuric acid may be added to a positive active material or positioned in contact with the electrolyte in the battery jar, thereby enabling these compounds to dissolve, as ions, in the electrolyte.

Since aluminum and selenium is soluble in sulfuric acid, they may be added to or mixed, as small pieces or powder, with the positive electrode, or positioned in contact with the electrolyte in the battery jar, thereby enabling these compounds to dissolve, as ions, in the electrolyte.

The alloy to be employed for the positive electrode may further contain, in addition to the aforementioned metals or compounds, at least one kind of element selected from silver 0.005-0.07 wt % in mixing ratio, bismuth 0.01-0.10 wt % in mixing ratio and thallium 0.001-0.05 wt % in mixing ratio. Further, although a gravity cast substrate was employed in these examples, it is of course possible in the present invention to use a substrate to be obtained by means of continuous casting or roll-working. Furthermore, in these examples, although the lead storage battery employed therein was formed of a flooded type battery where a great quantity of free electrolyte was accommodated, it was also possible to achieve almost the same effects as described above even with a sealed lead storage battery which was provided with a pressure control valve.

Examples 14-17; Comparative Examples 8 and 9

In the same manner as described in Example 1, lead storage batteries where aluminum ion was included in an electrolyte were manufactured. However, in these examples, the quantity of sodium ion to be included in the electrolyte after finishing the formation was set to the values shown in Table 2. In the same manner as described in Example 1, these lead storage batteries were assessed. The results are shown in Table 2.

TABLE 2

Quantity of ions added and charging efficiency

| | Ratio of Al (mol/l) | Ratio of Na in electrolyte (mol/l) | Ratio of residual capacity (%) |
| --- | --- | --- | --- |
| Comp. Ex. 8 | 0.1 | 0.1 | 50 |
| Comp. Ex. 9 | 0.1 | 0.06 | 52 |
| Example 14 | 0.1 | 0.05 | 55 |
| Example 15 | 0.1 | 0.02 | 65 |
| Example 16 | 0.1 | 0.01 | 67 |
| Example 17 | 0.1 | 0.005 | 69 |

As seen from Table 2, in the case of Comparative Examples 8 and 9, since the quantity of sodium ion exceeded over the upper limit (i.e. 0.05 mol/L) as defined by the present invention, the ratio of residual capacity was all less than 50%. Whereas, in the case of Examples of the present invention, even though the quantity of aluminum ion was 0.1 mol/L, i.e. the same as that of Comparative Examples, since the quantity of sodium was not more than 0.05 mol/L or the upper limit as defined by the present invention, the ratio of residual capacity was all more than 50%. By the way, it was possible to recognize almost the effects even if selenium ion or titanium ion was employed. Further, although a flooded type battery was exemplified in these examples, it was also possible to achieve almost the same effects even with a closed lead storage battery.

Examples 18-54; Comparative Examples 10-20

By making use of an alloy composition for a positive substrate, which is consisted of 0.04 wt % of calcium, 1.0 wt % of tin, 0.015 wt % of aluminum, 0.008 wt % of barium and the balance of lead and unavoidable impurities, a cast type substrate was manufactured by means of book molding. The casting was performed at a rate of 15 sheets per minute. The substrate thus cast was subjected to heat treatment for 3 hours at a temperature of 120° C. to obtain an age-hardened substrate.

Then, bismuth, calcium, tin, antimony or arsenic was added to lead powder for positive electrode at various ratios to obtain mixtures. By the way, bismuth, calcium and tin were added in the form of sulfate, and antimony and arsenic were added in the form of oxide. The quantity of these materials was set so as to correspond to the ratio of pure metal additionally added to the mass of positive active material.

Then, a positive active material paste prepared according to the conventional method by making use of this lead powder was pasted into the substrate and then subjected to curing for 24 hours at a temperature of 40° C. in an atmosphere of 95% in humidity. Thereafter, the resultant plate was dried to obtain a positive plate of pre-formation. Thereafter, this positive plate, a negative plate of pre-formation which was prepared according to the ordinary method and a polyethylene separator were assembled and introduced into a battery jar. Subsequently, various kinds of electrolytes were prepared by making use of, as a sulfate, aluminum ion, selenium ion or titanium ion. These electrolytes were respectively injected into a battery jar to perform the jar formation, thus manufacturing 12V lead storage batteries of D23 size where 5-hour rated capacity was 50 Ah. In this case, the quantity of aluminum ion, selenium ion and titanium ion to be added was variously altered. When the electrolytes of these lead storage batteries where the aforementioned formation was accomplished were analyzed, the content of sodium ion therein was found to fall in the range 0.01 to 0.02 mol/L. Then, these lead storage batteries were subjected to life test under the condition of idling-stop, thus assessing these batteries.

First of all, these lead storage batteries were completely charged at a temperature of 25° C. using a 5-hour rated current. Then, these lead storage batteries were subjected to an idling-stop cycle life test which was repeated until the life of batteries was terminated, thus measuring the number of repetition of cycles. Namely, one cycle of this idling-stop life test was consisted of a period of constant-current discharging for 59 seconds with a current of 50 A and for one second with a current of 300 A at 25° C., and a period of constant-current/constant-voltage charging for 60 seconds with a current of 100 A and an upper limit voltage of 14.0V. In this case, although the temperature of batteries was gradually increased during the test due to Joule heat or reaction heat, it was stabilized at about 50° C. The results are shown in Tables 3, 4, 5 and 6 which also show the results of Comparative Examples.

TABLE 3

Life span of batteries where various kinds of ions were added to the electrolyte and positive electrode thereof (No. 1)

| | | Additives in electrolyte (mol/l) | | | Additives for cathode (wt. %) | | | | | Idling-stop life span (Repeated times) |
|---|---|---|---|---|---|---|---|---|---|---|
| | | Al | Se | Ti | Bi | Sb | Ca | Sn | As | |
| Comp. Exs. | 10 | — | — | — | — | — | — | — | — | 15000 |
| | 11 | — | — | — | 0.005 | — | — | — | — | 18000 |
| | 12 | — | — | — | 0.01 | — | — | — | — | 20000 |
| | 13 | — | — | — | 0.05 | — | — | — | — | 24000 |
| | 14 | — | — | — | 0.1 | — | — | — | — | 24000 |
| | 15 | — | — | — | 0.5 | — | — | — | — | 20000 |
| | 16 | — | — | — | 1.0 | — | — | — | — | 16000 |
| Examples | 18 | 0.1 | — | — | — | — | — | — | — | 32000 |
| | 19 | 0.1 | — | — | 0.005 | — | — | — | — | 34000 |
| | 20 | 0.1 | — | — | 0.01 | — | — | — | — | 36000 |
| | 21 | 0.1 | — | — | 0.02 | — | — | — | — | 38000 |
| | 22 | 0.1 | — | — | 0.05 | — | — | — | — | 40000 |
| | 23 | 0.1 | — | — | 0.1 | — | — | — | — | 40000 |
| | 24 | 0.1 | — | — | 0.2 | — | — | — | — | 38000 |
| | 25 | 0.1 | — | — | 0.5 | — | — | — | — | 33000 |

TABLE 4

Life span of batteries where various kinds of ions were added to the electrolyte and positive electrode thereof (No. 2)

| | | Additives in electrolyte (mol/l) | | | Additives for cathode (wt. %) | | | | | Idling-stop life span (Repeated times) |
|---|---|---|---|---|---|---|---|---|---|---|
| | | Al | Se | Ti | Bi | Sb | Ca | Sn | As | |
| Comp. Ex. | 17 | 0.1 | — | — | 1.0 | — | — | — | — | 24000 |
| Examples | 26 | 0.1 | — | — | 0.05 | — | 0.005 | — | — | 40000 |
| | 27 | 0.1 | — | — | 0.05 | — | 0.01 | — | — | 41000 |
| | 28 | 0.1 | — | — | 0.05 | — | 0.02 | — | — | 42000 |
| | 29 | 0.1 | — | — | 0.05 | — | 0.05 | — | — | 44000 |
| | 30 | 0.1 | — | — | 0.5 | — | 0.1 | — | — | 44000 |
| | 31 | 0.1 | — | — | 0.05 | — | 0.2 | — | — | 44000 |
| | 32 | 0.1 | — | — | 0.05 | — | 1.0 | — | — | 44000 |
| | 33 | 0.1 | — | — | — | 0.05 | — | — | — | 41000 |
| | 34 | 0.1 | — | — | — | 0.05 | — | 0.1 | — | 45000 |
| | 35 | 0.1 | — | — | — | 0.05 | — | — | 0.05 | 43000 |
| | 36 | 0.1 | — | — | — | — | 0.5 | — | — | 37000 |

TABLE 5

Life span of batteries where various kinds of ions were added to the electrolyte and positive electrode thereof (No. 3)

| | | Additives in electrolyte (mol/l) | | | Additives for cathode (wt. %) | | | | | Idling-stop life span (Repeated times) |
|---|---|---|---|---|---|---|---|---|---|---|
| | | Al | Se | Ti | Bi | Sb | Ca | Sn | As | |
| Comp. Ex. | 18 | 0.005 | — | — | 0.05 | — | — | — | — | 29000 |
| Examples | 37 | 0.01 | — | — | 0.05 | — | — | — | — | 32000 |
| | 38 | 0.03 | — | — | 0.05 | — | — | — | — | 39000 |
| | 39 | 0.05 | — | — | 0.05 | — | — | — | — | 40000 |
| | 40 | 0.2 | — | — | 0.05 | — | — | — | — | 36000 |
| | 41 | 0.3 | — | — | 0.05 | — | — | — | — | 31000 |
| Comp. Ex. | 19 | 0.4 | — | — | 0.05 | — | — | — | — | 24000 |
| Examples | 42 | — | 0.0002 | — | 0.05 | — | — | — | — | 31000 |
| | 43 | — | 0.0005 | — | 0.05 | — | — | — | — | 37000 |
| | 44 | — | 0.001 | — | 0.05 | — | — | — | — | 39000 |
| | 45 | — | 0.0012 | — | 0.05 | — | — | — | — | 39000 |

TABLE 6

Life span of batteries where various kinds of ions were added to the electrolyte and positive electrode thereof (No. 4)

| | | Additives in electrolyte (mol/l) | | | Additives for cathode (wt. %) | | | | | Idling-stop life span (Repeated times) |
|---|---|---|---|---|---|---|---|---|---|---|
| | | Al | Se | Ti | Bi | Sb | Ca | Sn | As | |
| Examples | 46 | 0.1 | 0.001 | — | 0.05 | — | — | — | — | 41000 |
| | 47 | — | — | 0.001 | 0.05 | — | — | — | — | 31000 |
| | 48 | — | — | 0.005 | 0.05 | — | — | — | — | 36000 |
| | 49 | — | — | 0.01 | 0.05 | — | — | — | — | 38000 |
| | 50 | — | — | 0.02 | 0.05 | — | — | — | — | 38000 |
| | 51 | — | — | 0.05 | 0.05 | — | — | — | — | 36000 |
| | 52 | — | — | 0.1 | 0.05 | — | — | — | — | 32000 |
| Comp. Ex. | 20 | — | — | 0.2 | 0.05 | — | — | — | — | 22000 |
| Examples | 53 | 0.1 | — | 0.01 | 0.05 | — | — | — | — | 42000 |
| | 54 | 0.1 | 0.001 | 0.01 | 0.05 | — | — | — | — | 43000 |

As seen from Table 3, in the case of the examples where aluminum ion, selenium ion or titanium ion was not included in the electrolyte, the cycle life thereof was all 25000 times or less even if bismuth was added to the positive electrode. In the case of Examples 18-25, aluminum ion was included in the electrolyte at a ratio of 0.1 mol/L. Among them, Example 18 represents where bismuth ion was not incorporated, and Examples 19-25 represent where bismuth ion was incorporated at various ratios. In these examples however, the life cycle was all more than 25000 times. In particular, in the case of Example 23, the cycle life was increased up to 40000.

Table 4 shows Examples 26-32, 34 and 35 where two or more kinds of metals were added as an additive for the positive electrode. In these examples, the cycle life thereof was all more than 40000 times, thus exhibiting excellent effects. In the case of Examples 33 and 36 also where antimony and calcium were added therein individually, they exhibited excellent effects. In the case of Comparative Example 17 where the electrolyte contained 0.1 mol/L of aluminum ion, since the quantity of bismuth incorporated as an additive in the positive electrode was as large as 1.0 wt %, the life thereof was deteriorated on the contrary.

In Table 5, there is indicated that in the case of Examples 37-41, since the content of aluminum ion is confined within the range of 0.01-0.3 mol/L, it was possible to elongate the life span thereof. In the case of Examples 42-45 where the content of selenium ion was confined within the range of 0.0002-0.0012 mol/L, it was possible to increase the life cycle span up to more than 30000. Comparative Examples 18 and 19 illustrates that if the content of aluminum ion was as little as 0.005 mol/L or was as too large as 0.4 mol/L, the life cycle span thereof would be short.

In Table 6, there is indicated that if the content of titanium ion is confined within the range of 0.001-0.1 mol/L, it is possible to elongate the life cycle span thereof. Further, if the content of titanium ion is excessively increased to 0.2 mol/L as shown in Example 20, the life of idling-stop would be shortened. In the case of Example 54 where aluminum ion, selenium ion or titanium ion were concurrently incorporated in the electrolyte, it was possible to increase the life cycle span up to more than 40000.

Although a gravity cast substrate was employed in these examples, it is of course possible in the present invention to use a substrate to be obtained by means of continuous casting or roll-working. Further, although each of the metals was added as sulfate or oxide to the active material in these examples, as long as the metal is soluble in an aqueous solution of sulfuric acid or in water, the metals can be easily mixed with active material, the metals can be incorporated into the active material as a compound such as sulfite, carbonate, hydrogen carbonate, phosphate, borate, hydroxide, metallic acid salt. Bismuth, antimony, calcium, tin and arsenic can be coated, in the form of compounds as described above, on the surface of positive grid, thus forming a layer of compound. Alternatively, these metals can be plated on the surface of positive grid. Furthermore, in these examples, although the lead storage battery employed therein was formed of a flooded type battery, it was also possible to achieve almost the same effects as described above even with a sealed lead storage battery.

Examples 55-60; Comparative Examples 21-23

By following the same process as described in Example 3, a 12V lead storage battery of D23 size where 5-hour rated capacity was 50 Ah was manufactured. The jar formation of battery jar was performed with the content of aluminum ion in the electrolyte being kept constant at 0.1 mol/L and the content of lithium ion being fluctuated. When the electrolytes of these lead storage batteries were analyzed after finishing the formation, the content of sodium ion therein was found to fall in the range 0.01 to 0.02 mol/L. These aluminum ion and lithium ion were respectively employed as sulfate. Further, the measurements of 5-hour rated capacity and idling-stop life were performed by treating the lead storage batteries in the same manner as in Example 4.

TABLE 7

Life span of batteries where lithium was added therein

|  |  | Kinds of metal | | 5HR capacity | Idling-stop life span |
|---|---|---|---|---|---|
|  |  | Li (mol/l) | Al (mol/l) | (AR) | (Repeated times) |
| Comp. Exs. | 21 | 0 | 0 | 50 | 15000 |
|  | 22 | 0.02 | 0 | 56 | 15000 |
| Examples | 55 | 0.005 | 0.1 | 52 | 33000 |
|  | 56 | 0.01 | 0.1 | 57 | 34000 |
|  | 57 | 0.02 | 0.1 | 60 | 35000 |
|  | 58 | 0.04 | 0.1 | 60 | 35000 |
|  | 59 | 0.07 | 0.1 | 58 | 34000 |
|  | 60 | 0.14 | 0.1 | 51 | 32000 |
| Comp. Ex. | 23 | 0.18 | 0.1 | 43 | 23000 |

It will be recognized from Comparative Example 22 that in the case of a lead storage battery where only lithium ion was incorporated therein without the incorporation of aluminum ion, although it was possible to increase the 5-hour rated capacity, it was impossible to enhance the idling-stop life of battery. Whereas, as shown in Examples 55-60, it will be recognized that when lithium ion and aluminum ion were concurrently incorporated in the lead storage battery, it was possible to enhance both of the 5-hour rated capacity and idling-stop life of battery.

It will be recognized from Comparative Example 23 that when lithium ion was excessively incorporated in the battery, both of the 5-hour rated capacity and idling-stop life of battery would be deteriorated. When this lead storage battery was disintegrated for research, it was confirmed that the softening of positive active material was proceeded faster than that was expected from the number of times obtained from the cycle life test and that the excessive incorporation of lithium ion would promote the softening of active material.

Examples 61-67; Comparative Examples 24-29

Lead storage batteries were manufactured as follows to confirm the effects to be obtained from the addition of carbon. For the purpose of preparing a negative electrode of pre-formation (i.e. not yet subjected to formation), acetylene black (a kind of carbon black) having a specific surface area of 70 $m^2/g$ and barium sulfate powder were added to lead oxide which was prepared by means of ball mill, which was then subjected to dry mixing. By the way, the content of carbon powder was variously fluctuated.

To the resultant mixture, an aqueous solution of lignin was added and then kneaded while gradually adding ion-exchange water thereto, thus preparing an aqueous paste. Then, the paste was kneaded while adding dilute sulfuric acid having a specific gravity of 1.36 to the paste, thus preparing a negative active material paste. The quantity of ion-exchange water employed herein was set to about 10 parts by weight and the quantity of dilute sulfuric acid was set to 10 parts by weight, both based on 100 parts by weight of lead oxide. Further, the quantity of ion-exchange water was adjusted so as to make the cup density of the paste thus finished about 140 g/2 $in^3$. The resultant paste was then pasted into a cast substrate made of a Pb—Ca-based alloy and subjected to curing for 24 hours at a temperature of 40° C. in an atmosphere of 95% in humidity and then dried to obtain a negative plate of pre-formation.

Further, for the purpose of manufacturing a positive plate of pre-formation, 100 parts by weight of lead oxide was kneaded while gradually adding 10 parts by weight of ion-exchange water and then 10 parts by weight of dilute sulfuric acid having a specific gravity of 1.27 thereto, thus preparing a positive active material paste. This paste was prepared so as to make the cup density thereof about 140 g/2 in$^3$. The resultant paste was then passed into a cast substrate made of a Pb—Ca-based alloy and subjected to curing for 24 hours at a temperature of 40° C. in an atmosphere of 95% in humidity and then dried to obtain a positive plate of pre-formation.

The assembling of lead storage battery was performed as follows. Namely, a fine porous separator was combined with these plates of pre-formation and these plates were welded together by means of COS welding to prepare a group of plates, which was placed in a battery jar made of polypropylene and the battery jar was closed by means of heat sealing. An electrolyte containing, as sulfate, 0.1 mol/L of aluminum ion was injected into the battery jar, thus performing the jar formation of battery to manufacture a 12V lead storage battery of D23 size with 50 Ah. The specific gravity of the electrolyte of this lead storage battery was 1.28.

Then, these lead storage batteries were completely charged at a temperature of 25° C. using a 5-hour rated current. Then, these lead storage batteries were subjected to an idling-stop life test. The results are shown in Table 8 which also shows the results of Comparative Examples.

TABLE 8

Life span of batteries where carbon was added therein

|  |  | Quantity of carbon and metal | | Idling-stop life |
|---|---|---|---|---|
|  |  | Carbon (mol/l) | Al (mol/l) | span (Repeated times) |
| Comp. Exs. | 24 | 0.1 | 0 | 15000 |
|  | 25 | 0.2 | 0 | 17000 |
|  | 26 | 0.5 | 0 | 18000 |
|  | 27 | 1.0 | 0 | 18000 |
|  | 28 | 2.5 | 0 | 18000 |
|  | 29 | 5.0 | 0 | 18000 |
| Examples | 61 | 0.05 | 0.1 | 28000 |
|  | 62 | 0.1 | 0.1 | 32000 |
|  | 63 | 0.2 | 0.1 | 35000 |
|  | 64 | 0.5 | 0.1 | 37000 |
|  | 65 | 1.0 | 0.1 | 38000 |
|  | 66 | 2.5 | 0.1 | 39000 |
|  | 67 | 5.0 | 0.1 | 39000 |

It was recognized from Comparative Examples 24-29 that even if the content of carbon was increased to more than 0.5 wt %, if aluminum was not incorporated in the battery, it was impossible to expect the elongation of life span, and that if aluminum ion was included in the electrolyte, the life span in idling-stop could be greatly enhanced due to the synergistic effects of these ions. However, the content of carbon was increased over 0.5 wt %, it was impossible to obtain further increased effects. Further, when selenium ion and/or titanium ion was substituted for aluminum ion, it was possible to obtain almost the same effects as described above. Although acetylene black was employed in these examples, any kind of carbon black such as furnace black, graphite, activated carbon, etc. can be employed as long as carbon black is electrically conductive. By the way, the specific surface area of carbon black should preferably be not more than 300 m$^2$/g. If the specific surface area of carbon black is higher than this upper limit, hydrogen may be caused to excessively generate during the charging, thus accelerating the decrease of electrolyte.

Examples 68-71; Comparative Examples 30-33

Lead storage batteries were manufactured as follows to confirm the effects to be obtained from the addition of expanded graphite. For the purpose of preparing a negative plate of pre-formation, acetylene black having a specific surface area of 70 m$^2$/g and barium sulfate powder were added to lead oxide which was prepared by means of ball mill, which was then subjected to dry mixing. To the resultant mixture, an aqueous solution of lignin was added and then kneaded while gradually adding ion-exchange water thereto, thus preparing an aqueous paste. Then, the paste was kneaded while adding dilute sulfuric acid having a specific gravity of 1.36 to the paste, thus preparing a negative active material paste. The quantity of ion-exchange water employed herein was set to about 10 parts by weight and the quantity of dilute sulfuric acid was set to 10 parts by weight, both based on 100 parts by weight of lead oxide. By the way, the quantity of ion-exchange water was adjusted so as to make the cup density of the paste thus finished about 140 g/2 in$^3$. The resultant paste was then pasted into a cast substrate made of a Pb—Ca-based alloy and subjected to aging for 24 hours at a temperature of 40° C. in an atmosphere of 95% in humidity and then dried to obtain a negative plate of pre-formation.

Further, for the purpose of manufacturing a positive plate of pre-formation, 100 parts by weight of lead oxide was kneaded while gradually adding 10 parts by weight of ion-exchange water and then 10 parts by weight of dilute sulfuric acid having a specific gravity of 1.27 thereto, thus preparing a positive paste. By the way, the quantity of expanded graphite was variously fluctuated. This paste was prepared so as to make the cup density thereof about 144 g/2 in$^3$. The resultant paste was then pasted into a cast substrate made of a Pb—Ca-based alloy and subjected to curing for 24 hours at a temperature of 40° C. in an atmosphere of 95% in humidity and then dried to obtain a positive plate of pre-formation.

The assembling of lead storage battery was performed as follows. Namely, a fine porous separator was combined with these plates of pre-formation and these plates were welded together by means of COS welding to prepare a group of plates, which was placed in a battery jar made of polypropylene and the battery jar was closed by the lid by means of heat sealing. An electrolyte containing, as sulfate, 0.1 mol/L of aluminum ion was injected into the battery jar, thus performing the jar formation of battery to manufacture a 12V lead storage battery of D23 size with 50 Ah. The specific gravity of the electrolyte of this lead storage battery was 1.28.

Then, these lead storage batteries were completely charged at a temperature of 25° C. using a 5-hour rated current and then discharged with 5-hour rated current. Then, these lead storage batteries were subjected to JIS heavy-load life test, wherein these lead storage batteries were completely charged at a temperature of 25° C. using a 5-hour rated current. Thereafter, a cycle consisting of the discharging of these lead storage batteries at a temperature of 40° C. with a current of 20 A and the charging thereof with a current of 5A and a 5-hour rated current was repeated until the life of batteries was terminated, thus measuring the number of cycles. By making use of these lead storage batteries, an idling-stop life test was performed, wherein the conditions of test were the same as those of Example 3. The results are summarized in Table 9.

TABLE 9

Life span of batteries where expanded graphite was added therein

| | | Expansive graphite (wt/%) | Metal ion Al (mol/l) | Metal ion Bi (wt. %) | 5H capacity (AR) | Heavy-load life (times) | Idling-stop life span (Repeated times) |
|---|---|---|---|---|---|---|---|
| Comp. Exs. | 30 | 0 | 0 | 0 | 50 | 100 | 15000 |
| | 31 | 0.5 | 0 | 0 | 55 | 50 | 13000 |
| | 32 | 0 | 0 | 0.05 | 48 | 180 | 24000 |
| | 33 | 0.5 | 0 | 0.05 | 55 | 180 | 24000 |
| Examples | 68 | 0.1 | 0.1 | 0.05 | 53 | 250 | 40000 |
| | 69 | 0.5 | 0.1 | 0.05 | 55 | 200 | 40000 |
| | 70 | 1 | 0.1 | 0.05 | 57 | 180 | 40000 |
| | 71 | 2 | 0.1 | 0.05 | 57 | 160 | 40000 |

Comparative Examples 31 and 32 illustrate the cases wherein expanded graphite and bismuth were singly employed, respectively. It was possible, through the addition of expanded graphite, to increase the utilization factor of the positive electrode and to increase the 5-hour rated capacity of these lead storage batteries. However, the softening of positive active material was accelerated and hence the heavy-load life thereof was deteriorated lower than the case where expanded graphite was not incorporated, thus decreasing the idling-stop life to less than 25000 times. In the case of Comparative Example 33 where expanded graphite and bismuth were concurrently employed, although it was possible to improve the 5-hour rated capacity and the heavy-load life, the idling-stop life was decreased also to less than 25000 times. In the case of examples where expanded graphite and bismuth were concurrently applied to the positive electrode and aluminum ion was added to the electrolyte, it was possible not only to enhance the 5-hour rated capacity but also to improve the heavy-load life and the idling-stop life, thus indicating synergistic effects that could be obtained from the concurrent employment of these materials. Further, when selenium ion and/or titanium ion was substituted for aluminum ion, it was possible to obtain almost the same effects as described above. Furthermore, even when antimony or calcium was substituted for bismuth, even when tin was additionally incorporated therein, or even when antimony and arsenic were concurrently employed, it was also possible to obtain almost the same effects as described above. Furthermore, in these examples, although the lead storage battery employed therein was formed of a flooded type battery, it was also possible to achieve almost the same effects as described above even with a sealed lead storage battery.

INDUSTRIAL APPLICABILITY

As described above, the present invention is applicable to a lead storage battery which is adapted to be used in a partial state of charge (PSOC) where the state of charge is confined within the range of more than 70% to less than 100%, such as in the case of idling-stop, charge-control, hybrid system, etc., i.e. a lead storage battery which is designed to be used with long life.

The invention claimed is:
1. A lead storage battery which is operable to be used in a partial state of charge where the state of charge is confined within a range of more than 70% to less than 100%, comprising:
a group of plates housed in a battery jar, and an electrolytic solution comprising metal ions dissolved in an aqueous solution of sulfuric acid contained in the battery jar;
wherein the group of plates are formed of a stack constituted by (i) a plurality of negative substrates comprising grid substrates filled with a negative active material, (ii) a plurality of positive substrates comprising grid substrates filled with a positive active material, and (iii) a porous separator interposed between negative electrodes and positive electrodes; and
wherein the metal ions consist essentially of: 0.01 to 0.1 mol/L of aluminum ions; 0.005 to 0.02 mol/L of sodium ions; and unavoidable impurities.

2. The lead storage battery according to claim 1, wherein a surface of the positive substrates and/or the positive active material further contains at least one kind of metal selected from the group consisting of metals of bismuth, calcium and antimony, and/or a compound of said at least one kind of metal.

3. The lead storage battery according to claim 2, wherein 0.005 to 0.5% by weight of bismuth, 0.005 to 0.2% by weight of antimony and 0.005 to 1.5% by weight of calcium are contained in the surface of the positive substrates and/or the positive active material as pure metals based on the weight of positive active material.

4. The lead storage battery according to claim 2, wherein the surface of the positive substrates and/or the positive active material further contains tin and/or arsenic as a metal and a compound.

5. The lead storage battery according to claim 4, wherein the surface of the positive substrates and/or the positive active material further contains tin and/or arsenic in the following amounts: when the positive active material contains solely tin, the amount of tin is 0.05 to 1.0% by weight, or when the positive active material contains solely arsenic, the amount is 0.005 to 1.0% by weight, or when the positive active material contains both tin and arsenic, the amount of tin is 0.05 to 1.0% by weight and the amount of arsenic is 0.005 to 0.2% by weight.

6. The lead storage battery according to claim 1, wherein the positive substrates are formed of a lead-calcium-based alloy; a surface of the positive substrates and/or the positive active material contains at least one kind of metal selected from the group consisting of bismuth, antimony and calcium, and/or a compound of said at least one kind of metal; and the negative active material further contains 0.05-5.0 wt % of carbon.

7. The lead storage battery according to claim 6, wherein the carbon included in the negative active material is carbon black, graphite or activated carbon.

8. The lead storage battery according to claim 1, wherein the positive active material contains expanded graphite.

9. The lead storage battery according to claim 8, wherein the positive active material contains expanded graphite in an amount of 0.1-2.0 wt % based on the positive active material.

10. The lead storage battery according to claim 1, wherein the negative active material further contains 0.05-5.0 wt % of carbon.

11. A lead storage battery which is operable to be used in a partial state of charge where the state of charge is confined within a range of more than 70% to less than 100%, comprising a group of plates housed in a battery jar, and an electrolytic solution comprising metal ions dissolved in an aqueous solution of sulfuric acid contained in the battery jar;

wherein the group of plates are formed of a stack constituted by (i) a plurality of negative substrates comprising grid substrates filled with a negative active material, (ii) a plurality of positive substrates comprising grid substrates filled with a positive active material, and (iii) a porous separator interposed between negative electrodes and positive electrodes; and wherein the metal ions consist essentially of: 0.01 to 0.1 mol/L of aluminum ions; 0.005 to 0.02 mol/L of sodium ions; 0.005 to 0.14 mol/L of lithium ions; and unavoidable impurities.

* * * * *